United States Patent
Yuan

(10) Patent No.: US 10,455,207 B2
(45) Date of Patent: Oct. 22, 2019

(54) METHOD, COMPUTING DEVICE AND NONVOLATILE COMPUTER READABLE STORAGE MEDIUM FOR PROCESSING WHITE BALANCE

(71) Applicant: GUANGDONG OPPO MOBILE TELECOMMUNICATIONS CORP., LTD., Dongguan, Guangdong (CN)

(72) Inventor: Quan Yuan, Guangdong (CN)

(73) Assignee: Guangdong Oppo Mobile Telecommunications Corp., Ltd., Dongguan (CN)

(*) Notice: Subject to any disclaimer, the term of this patent is extended or adjusted under 35 U.S.C. 154(b) by 0 days.

(21) Appl. No.: 16/031,133

(22) Filed: Jul. 10, 2018

(65) Prior Publication Data
US 2019/0014299 A1    Jan. 10, 2019

(30) Foreign Application Priority Data
Jul. 10, 2017    (CN) .......................... 2017 1 0557981

(51) Int. Cl.
*H04N 9/73*    (2006.01)
*H04N 9/04*    (2006.01)
(Continued)

(52) U.S. Cl.
CPC ......... *H04N 9/735* (2013.01); *H04N 5/23219* (2013.01)

(58) Field of Classification Search
CPC .... H04N 5/23219; H04N 9/735; H04N 9/045; H04N 9/3182; G06T 7/174
(Continued)

(56) References Cited

U.S. PATENT DOCUMENTS

2007/0085911 A1    4/2007 Nakamura
2007/0189752 A1*   8/2007 Kobayashi ............. G03B 15/03
                                                      396/157
(Continued)

FOREIGN PATENT DOCUMENTS

CN    101448085 A    6/2009
CN    101527860 A    9/2009
(Continued)

OTHER PUBLICATIONS

International Search Report in international application No. PCT/CN2018/094754, dated Sep. 26, 2018.
(Continued)

*Primary Examiner* — Marly S Camargo
(74) *Attorney, Agent, or Firm* — Ladas & Parry LLP

(57) ABSTRACT

Provided is a method and device for processing white balance. The method includes: acquiring a first image frame with a face image at a first acquisition time point, and a second image frame without a face image at a second acquisition time point different from the first acquisition time point; performing a white balance processing for the first image frame based on a first gain value; performing a white balance processing for the second image frame based on a second gain value; determining a transitional gain value for a transitional image frame acquired between the first acquisition time point and the second acquisition time point, based on a transition strategy for transition between the first image frame and the second image frame; and performing a white balance processing for the transitional image frame based on the transitional gain value. A computing device and a nonvolatile computer readable storage medium are also disclosed.

20 Claims, 5 Drawing Sheets

(51) Int. Cl.
*H04N 9/31* (2006.01)
*G06T 7/174* (2017.01)
*H04N 5/232* (2006.01)

(58) Field of Classification Search
USPC ....... 348/223.1, 224.1, 229.1, 222.1, 208.13; 382/274, 254, 162, 167, 118
See application file for complete search history.

(56) References Cited

U.S. PATENT DOCUMENTS

| | | | | |
|---|---|---|---|---|
| 2013/0167892 | A1* | 7/2013 | Birkeland et al. | H04N 9/735 348/223.1 |
| 2015/0036019 | A1* | 2/2015 | Takayama | H04N 9/73 348/223.1 |
| 2015/0222789 | A1 | 8/2015 | Noorkami et al. | |
| 2019/0019312 | A1* | 1/2019 | Yuan | G06T 7/90 382/118 |

FOREIGN PATENT DOCUMENTS

| | | |
|---|---|---|
| CN | 105960797 A | 9/2016 |
| CN | 107257455 A | 10/2017 |
| JP | 2006295303 A | 10/2006 |
| JP | 2010050651 A | 3/2010 |

OTHER PUBLICATIONS

English Translation of the Written Opinion of the International Search Authority in international application No. PCT/CN2018/094754, dated Sep. 26, 2018.
European Search Report in European application No. EP18182583, dated Oct. 1, 2018.
CN 101527860 A _ English Abstract.

* cited by examiner

METHOD, COMPUTING DEVICE AND NONVOLATILE COMPUTER READABLE STORAGE MEDIUM FOR PROCESSING WHITE BALANCE

CROSS REFERENCE TO RELATED APPLICATIONS

This application claims priority to Chinese patent application No. 201710557981.3 titled "METHOD AND DEVICE FOR PROCESSING WHITE BALANCE", and filed on Jul. 10, 2017, the disclosure of which is hereby incorporated by reference in its entirety.

TECHNICAL FIELD

The present disclosure relates generally to the field of imaging technique, and more particularly; to a method, computing device and nonvolatile computer readable storage medium for processing white balance.

BACKGROUND

With the improvement of science and technology and the development of image processing technology, the mobile terminal (such as smart-phone and personal digital assistant) has increasingly obvious progress at taking pictures. There is not only image processing software for processing automatic white balance (AWB), but also a technology of automatic white balance directed to face (FACEAWB).

However, in practice, the calculated result of AWB is quite different between an image taken when there is a human face and an image taken when there is no human face. The calculated result of AWB of an image to be taken will be significantly changed when the image is switched between a state where there is a human face and a state there is no human face. As a result, during such switching, the color of the image may be changed suddenly, causing a bad user experience.

BRIEF DESCRIPTION OF DRAWINGS

The above and other aspects, features, and advantages of certain exemplary embodiments of the present disclosure will be more apparent from the following description taken in conjunction with the accompanying drawings, in which.

DETAILED DESCRIPTION

Figure 1:
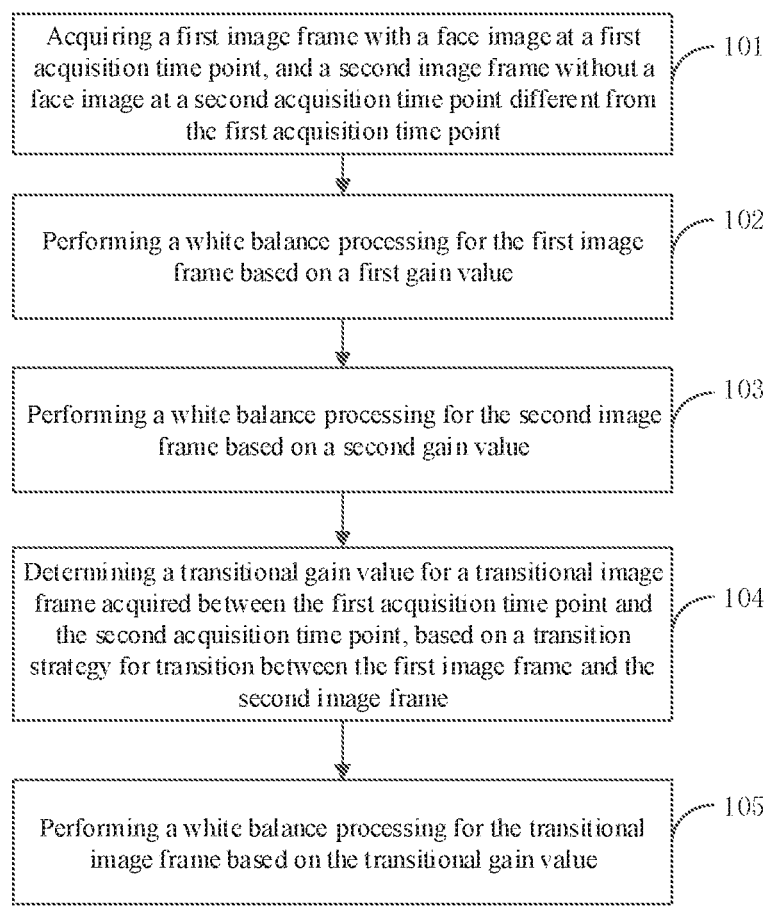
FIG. 1 is a flow diagram illustrating a method for processing white balance according to an embodiment of the present disclosure.

Descriptions will be made in detail to embodiments of the present disclosure, examples of which are illustrated in drawings, in which the same or similar elements and the elements having same or similar functions are denoted by like reference numerals throughout the descriptions. The embodiments described herein with reference to drawings are explanatory, are intended to understand the present disclosure, and are not construed to limit the present disclosure.

A method and device for processing white balance according to embodiments of the present disclosure will be described below with reference to the accompanying drawings.

FIG. 1 is a flow diagram illustrating a method for processing white balance according to an embodiment of the present disclosure. This method is mainly used in a scene where a device with a camera device takes an image with a front-facing camera or in a portrait mode.

At block 101, a first image frame with a face image at a first acquisition time point, and a second image frame without a face image may be acquired at a second acquisition time point different from the first acquisition time point.

Specifically, after a camera is activated, the camera may acquire an image in a preview mode. The images acquired by the camera may be stored by frame, and the images acquired at different times may be different.

The frame is the smallest unit of a single image in an image video, this is, one frame is one static image.

At block 102, a white balance processing may be performed for the first image frame based on a first gain value. The first image frame is an image frame including a face image, and the first gain value is configured to adjust a color of the face image in the first image frame to a skin color. Specifically, it may be determined whether the color of the face in the image is a skin color of a normal face. If not, a first gain value which can adjust the color of the face to the normal skin color may be generated.

In one embodiment, color components of all pixels in the face area may be acquired, and the color of each pixel may be represented by a color vector (R, G, B). The color vector corresponding to the skin color of the face may be calculated by taking an average of color vectors of all pixels in the face area. It may be determined whether the R, G and B values corresponding to the skin color of the face are within in ranges of the R, G and B values corresponding to the skin color of the normal face respectively. If not, the R, G and B values corresponding to the skin color of the face may be adjusted with a gain value, so that the R, G and B values corresponding to the skin color of the face are within in the ranges of the R, G and B values corresponding to the skin color of the normal face respectively. Such gain value is the first gain value.

The ranges of the R, G and B values corresponding to the skin color of the normal face may be determined based on the R, G and B values provided in a color matrix CC. The R, G and B values in the color matrix CC may be obtained based on the CIE color space provided by International Commission on Illumination.

At block 103, a white balance processing may be performed for the second image frame based on a second gain value. Specifically, the second image frame is an image including no face image. The second gain value is different from the first gain value, and the second gain value is a gain value configured to adjust the white balance of an image without a face image.

In one embodiment, the second gain value may be calculated based on the various color components in the image. When the color in the image has a enough color change, the average value of each of R, G and B components in the color vectors of all pixels tend to balance (1:1:1). A weighted gray algorithm may be used to have a relatively accurate white balance gain value, i.e., the second gain value.

Specifically, the face area may be divided into several sub areas. Color components of all pixels in each sub area may be acquired, and each pixel may be represented by a color vector (R, G, B). The average value and standard deviation of each of R, G and B channels in each sub area may be calculated. The standard deviations for each sub area may be weighted to abandon the sub area with weak correlation and retain the sub area with strong correlation, so that the effect of a large sub area with a single color can be reduced to make the color of the image richer. The weighted average value of each of the R, G and B channels may be calculated with the deviations, to obtain the gain coefficient of each of the R, G and B channels, i.e., the second gain value.

At block 104, a transitional gain value for a transitional image frame acquired between the first acquisition time point and the second acquisition time point may be determined based on a transition strategy for transition between the first image frame and the second image frame.

In one embodiment, when the first acquisition time point is earlier than the second acquisition time point, the transitional gain value for the transitional image frame may be determined based on a transition strategy for transition from the first gain value to the second gain value.

In another embodiment, when the first acquisition time point is later than the second acquisition time point, the transitional gain value for the transitional image frame may be determined based on a transition strategy for transition from the second gain value to the first gain value.

The transition strategy may include a smooth curve indicating correspondence between gain values in a range from the first gain value to the second gain value and acquisition time points, and/or a rate of change indicating an extent of change in gain value per unit of acquisition time point.

At block 105, a white balance processing may be performed for the transitional image frame based on the transitional gain value. Specifically, based on the calculated transitional gain values, the gain value corresponding to the red component R in the color components of the transitional image frame may be multiplied by the value of the red component R to obtain a processed value of the red component R after the white balance processing, and the gain value corresponding to the blue component B in the color components of the transitional image frame may be multiplied by the value of the blue component B to obtain a processed value of the blue component B after the white balance processing, so that the adjustment of the color of the transitional image frame can be achieved.

It should be noted that for a normal camera, since human eye is most sensitive to a green light with a wave length in a range of 480-600 nm, and the green pixels are the largest group of pixels in the Bayer color array, the gain value of the green component is generally fixed, while the gain values of the red and blue components may be adjusted to achieve the adjustment of the red and blue components.

According to the method for processing white balance in this embodiment, a first image frame with a face image may be acquired at a first acquisition time point, a second image frame without a face image may be acquired at a second acquisition time point different from the first acquisition time point, a white balance processing may be performed for the first image frame based on a first gain value, a white balance processing may be performed for the second image frame based on a second gain value, a transitional gain value for a transitional image frame acquired between the first acquisition time point and the second acquisition time point may be determined based on a transition strategy for transition between the first image frame and the second image frame, and a white balance processing may be performed for the transitional image frame based on the transitional gain value. Such method can address the problem of bad user experience caused by the sudden change of color of the image to be taken when the image is switched between a state where there is a human face and a state there is no human face and the calculated result of AWB of the image is significantly changed.

To be clear, it is provided in the above embodiment a method of determining a transitional gain value for a transitional image frame to avoid the sudden change of the color of the image when the acquired image is switched between the first image frame with a face image and the second image frame without a face image. Another method for processing white balance is provided below.

Figure 2:
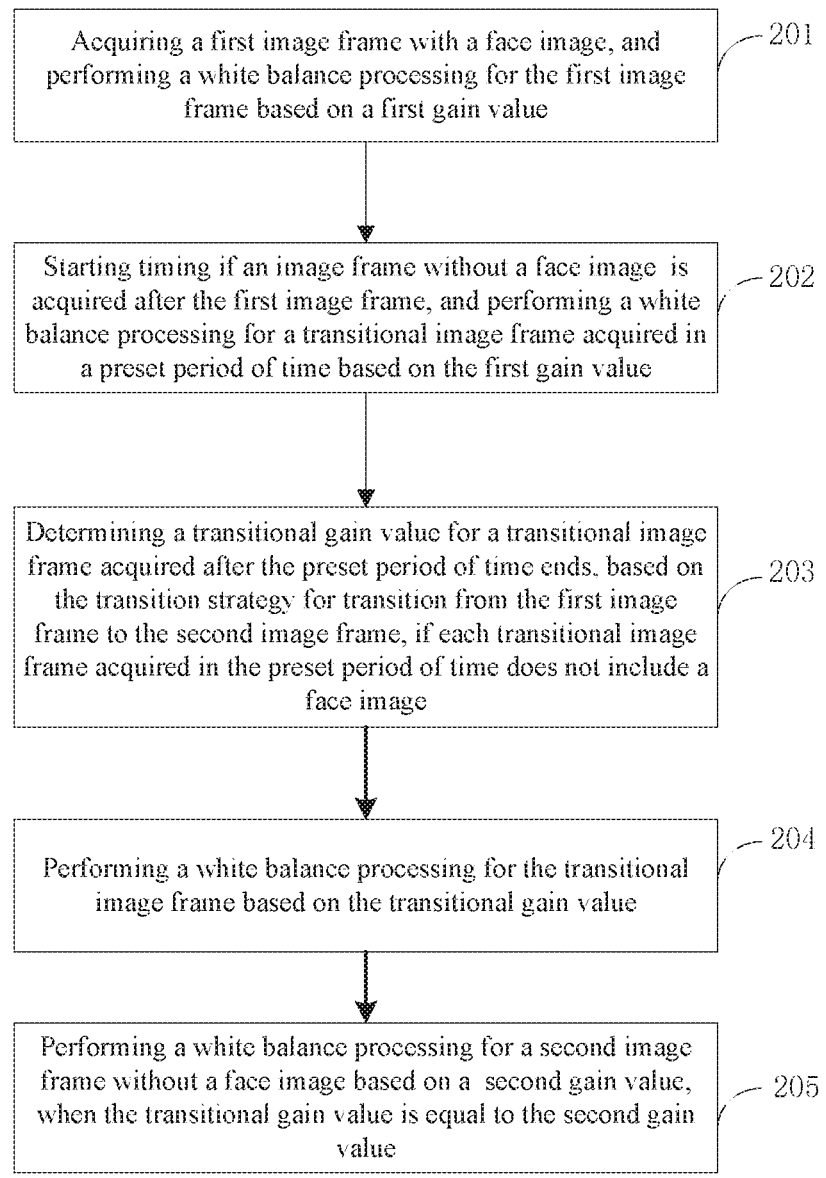
FIG. 2 is a flow diagram illustrating a method for processing white balance according to another embodiment of the present disclosure.

FIG. 2 is a flow diagram illustrating a method for processing white balance according to another embodiment of the present disclosure, which is applied to a scene where the acquired image frame is switched from an image frame with a face image to an image frame without a face image.

At block 201, a first image with a face image may be acquired, and a white balance processing may be performed for the first image frame based on a first gain value. Specifically, the first image frame is an image frame including a face image, and the first gain value is configured to adjust a color of the face image in the first image frame to a skin color.

Specifically, after a camera is activated, the camera may acquire an image in a preview mode. The images acquired by the camera may be stored by frame, and the images acquired at different times may be different.

At block 202, timing may be started if an image frame without a face image is acquired after the first image frame, and a white balance processing may be performed for a transitional image frame acquired in a preset period of time based on the first gain value. An initial time of the preset period of time is the first acquisition time point.

If the camera scene is switched from a scene with a face image to a scene without a face image, the timing is started when an image frame without a face image first appears, to avoid the unnecessary switching of the white balance processing algorithm caused by a condition where there is no face image in the acquired images for a short time. If there is no image frame with a face image for a certain period of time, it may be predicted that the subsequent image frame likely do not include a face image, and the white balance processing algorithm should be switched.

For example, if the preset period of time is a period of three seconds. That is, the gain value may be kept to be the first gain value for three seconds, and during this preset period of time, the first gain value may be used for the white balance processing for the transitional image frame.

At block 203, a transitional gain value for a transitional image frame acquired after the preset period of time ends may be determined, based on the transition strategy for transition from the first image frame to the second image frame, if each transitional image frame acquired in the preset period of time does not include a face image The transition strategy may include a smooth curve and/or a rate of change. The smooth curve is used to indicate correspondence between gain values in a range from the first gain value to the second gain value and acquisition time points. The rate of change is used to indicate an extent of change in gain value per unit of acquisition time point. With the transition strategy of the smooth curve or the rate of change, the second gain value may be transited to the first gain value through the transitional gain value, to avoid the flicker caused by the sudden change of the color of the image when the second gain value is directly transited to the first gain value which is quite different from the second gain value.

At block 204, a white balance processing for the transitional image frame is performed based on the transitional gain value.

At block 205, a white balance processing for a second image frame without a face image is performed based on a second gain value, when the transitional gain value is equal to the second gain value. Specifically, the second image frame is an image frame not including a face image, and the second gain value is configured for the white balance processing for the image frame without a face image.

In one embodiment, a weighted gray algorithm may be used to obtain the second gain value.

According to the method for processing white balance in this embodiment, a first image frame with a face image may be acquired at a first acquisition time point, a second image frame without a face image may be acquired at a second acquisition time point different from the first acquisition time point, a white balance processing may be performed for the first image frame based on a first gain value, a white balance processing may be performed for the second image frame based on a second gain value, a transitional gain value for a transitional image frame acquired between the first acquisition time point and the second acquisition time point may be determined based on a transition strategy for transition between the first image frame and the second image frame, and a white balance processing may be performed for the transitional image frame based on the transitional gain value. Such method can address the problem of bad user experience caused by the sudden change of color of the image to be taken when the image is switched between a state where there is a human face and a state there is no human face and the calculated result of AWB of the image is significantly changed.

Figure 3:
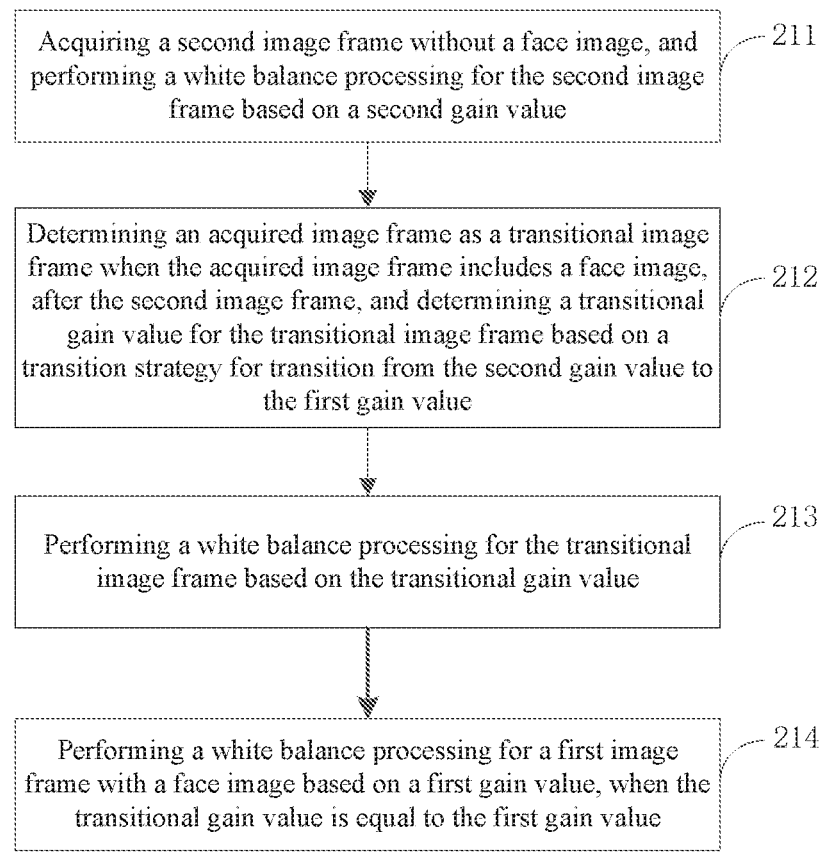
FIG. 3 is a flow diagram illustrating a method for processing white balance according to a further embodiment of the present disclosure.

FIG. 3 is a flow diagram illustrating a method for processing white balance according to a further embodiment of the present disclosure, which is applied to a scene where the acquired image frame is switched from an image frame without a face image to an image frame with a face image.

At block 211, a second image frame without a face image may be acquired, and a white balance processing for the second image frame may be performed based on a second gain value. Specifically, after a camera is activated, the camera may acquire an image in a preview mode. The images acquired by the camera may be stored by frame, and the images acquired at different times may be different.

At block 212, an acquired image frame is determined as a transitional image frame when the acquired image frame includes a face image, after the second image frame, and a transitional gain value for the transitional image frame is determined based on a transitional strategy for transition from the second gain value to the first gain value. Specifically, in a case where camera scene is switched from a scene without a face image to a scene with a face image, a corresponding transitional gain value may be used for the white balance processing for the image frame.

At block 213, a white balance processing for the transitional image frame may be performed based on the transitional gain value. Specifically, based on the calculated transitional gain values, the R value in the color components of the transitional image frame may be multiplied by the gain value corresponding to the red component in the transitional gain values to obtain a processed R value in the color components after the white balance processing, the B value in the color components of the transitional image frame may be multiplied by the gain value corresponding to the blue component in the transitional gain values to obtain a processed B value in the color components after the white balance processing, so that the adjustment of the color of the transitional image frame can be achieved.

At block 214, a white balance processing for a first image frame with a face image may be performed based on a first gain value, when the transitional gain value is equal to the first gain value. The first gain value is configured to adjust a color of the face image in the first image frame to a skin color. Specifically, the first image frame is an image frame including a face image, and the first gain value is configured to perform a white balance processing for an image frame with a face image.

According to the method for processing white balance in this embodiment, a first image frame with a face image may be acquired at a first acquisition time point, a second image frame without a face image may be acquired at a second acquisition time point different from the first acquisition time point, a white balance processing may be performed for the first image frame based on a first gain value, a white balance processing may be performed for the second image frame based on a second gain value, a transitional gain value for a transitional image frame acquired between the first acquisition time point and the second acquisition time point may be determined based on a transition strategy for transition between the first image frame and the second image frame, and a white balance processing may be performed for the transitional image frame based on the transitional gain value. Such method can address the problem of bad user experience caused by the sudden change of color of the image to be taken when the image is switched between a state where there is a human face and a state there is no human face and the calculated result of AWB of the image is significantly changed.

In order to implement the above embodiments, a device for processing white balance is also provided.

Figure 4:
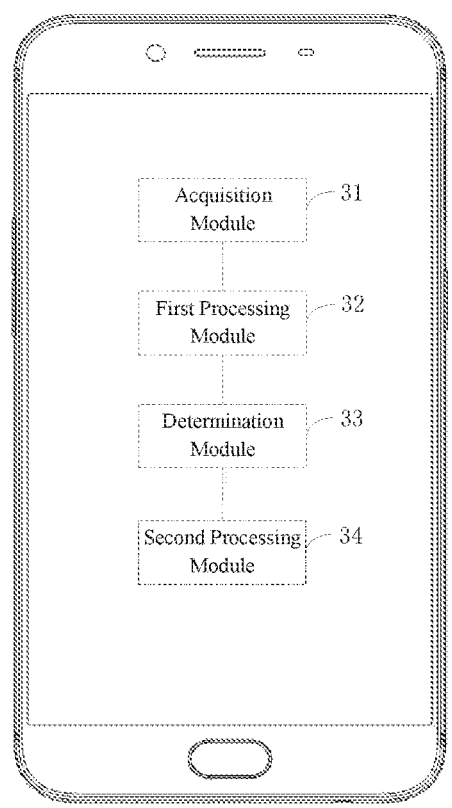
FIG. 4 is a structural schematic diagram illustrating a device for processing white balance according to an embodiment of the present disclosure.

FIG. 4 is a structural schematic diagram illustrating a device for processing white balance according to an embodiment of the present disclosure. As shown in FIG. 4, the device includes an acquisition module 31, a first processing module 32, a determination module 33 and a second processing module 34.

The acquisition module 31 is configured to acquire a first image frame with a face image at a first acquisition time point, and a second image frame without a face image at a second acquisition time point different from the first acquisition time point.

The first processing module 32 is configured to perform a white balance processing for the first image frame based on a first gain value configured to adjust a color of the face image in the first image frame to a skin color, and further configured to perform a white balance processing for the second image frame based on a second gain value different from the first gain value.

The determination module 33 is configured to determine a transitional gain value for a transitional image frame acquired between the first acquisition time point and the second acquisition time point, based on a transition strategy for transition between the first image frame and the second image frame.

The second processing module 34 is configured to perform a white balance processing for the transitional image frame based on the transitional gain value.

In one embodiment, the determination module 33 is further configured to determine the transitional gain value for the transitional image frame based on a transition strategy for transition from the second image frame to the first image frame, when the first acquisition time point is later than the second acquisition time point. When the transitional gain value is equal to the first gain value, the second processing module 34 is further configured to perform a white balance processing for an image frame with a face image based on the first gain value.

In one embodiment, the determination module 33 is further configured to determine the transitional gain value for the transitional image frame based on a transition strategy for transition from the first image frame to the second image frame, when the first acquisition time point is earlier than the second acquisition time point. When the transitional gain value is equal to the second gain value, the second processing module 34 is further configured to perform a white balance processing for an image frame without a face image based on the second gain value.

In one embodiment, when the first acquisition time point is earlier than the second acquisition time point, the second processing module 34 is further configured to perform a white balance processing for a transitional image frame acquired in a preset period of time based on the first gain value, wherein an initial time of the preset period of time is the first acquisition time point.

In one embodiment, if each transitional image frame acquired in the preset period of time does not include a face image, the determination module 33 is further configured to determine a transitional gain value for a transitional image frame acquired after the preset period of time ends, based on the transition strategy for transition from the first image frame to the second image frame In one embodiment, if at least one transitional image frame acquired in the preset period of time includes a face image, the second processing module 34 is further configured to perform a white balance processing for a transitional image frame acquired after the preset period of time ends based on the first gain value, if at least one transitional image frame acquired in the preset period of time includes a face image.

It should be noted that the above explanation for the embodiments the above method is also suitable for the device in this embodiment, which is not repeated here.

In the above device for processing white balance, an acquisition module is configured to acquire a first image frame with a face image at a first acquisition time point, and a second image frame without a face image at a second acquisition time point different from the first acquisition time point, a first processing module is configured to perform a white balance processing for the first image frame based on a first gain value, and perform a white balance processing for the second image frame based on a second gain value, a determination module is configured to determine a transitional gain value for a transitional image frame acquired between the first acquisition time point and the second acquisition time point, based on a transition strategy for transition between the first image frame and the second image frame, and a second processing module is configured to perform a white balance processing for the transitional image frame based on the transitional gain value. Such device can address the problem of bad user experience caused by the sudden change of color of the image to be taken when the image is switched between a state where there is a human face and a state there is no human face and the calculated result of AWB of the image is significantly changed.

A nonvolatile computer readable storage medium is also provided in the present disclosure, having computer executable instructions stored thereon. The computer executable instructions are configured to control a computing device to execute a method for processing white balance as described in the above embodiments.

Figure 5:
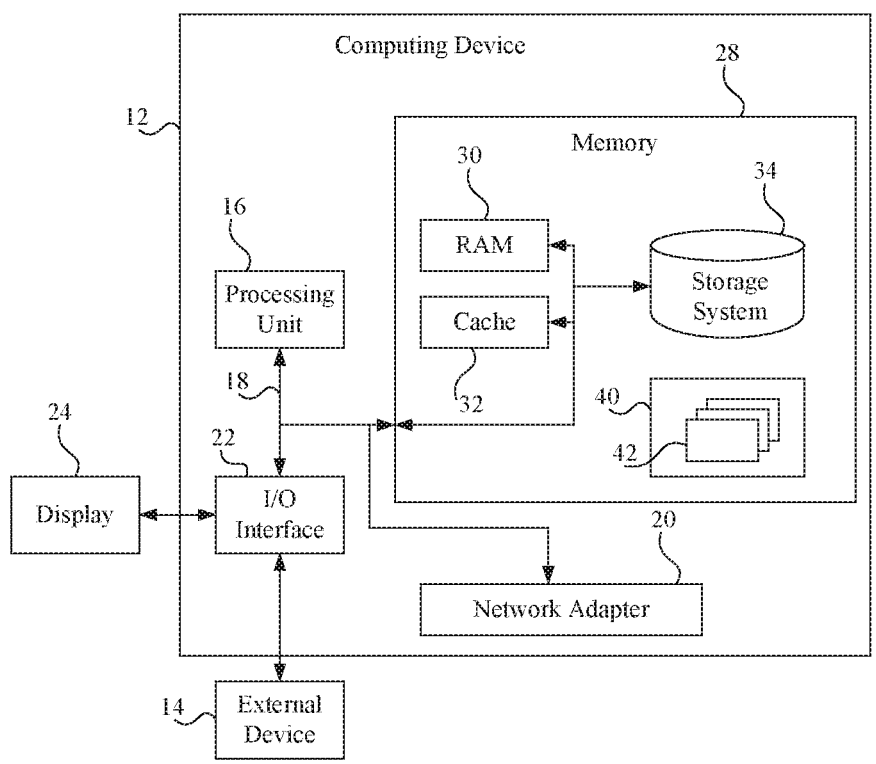
FIG. 5 is a block diagram illustrating an exemplary computing device adapted to implement embodiments of the present disclosure.

A computing device is also provided in the present disclosure. As shown in FIG. 5, for illustration purposes, only parts related to the embodiment of the present disclosure are shown. For undisclosed specific technical details, please refer to descriptions of the methods mentioned in the above embodiments of the present disclosure. The computing device may include mobile phone, tablet computer, personal digital assistant (PDA), point of sales (POS), on-board computer, wearable device and any other terminal devices.

FIG. 5 is a block diagram illustrating an exemplary computing device adapted to implement embodiments of the present disclosure. The computing device 12 as shown in FIG. 5 is only one example, and is not intended to suggest any limitation as to the scope of use or functionality of embodiments of the methodology described herein.

As shown in FIG. 5, the computing device 12 is shown in the form of a general-purpose computing device. Components of the computing device 12 may include, but are not limited to, one or more processors or processing units 16, a system memory 28, and a bus 18 that couples various system components including system memory 28 to the processing unit 16.

Bus 18 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computing device 12 may include a variety of computer system readable medium. Such medium may be any available medium that is accessible by the computing device 12, and it may include both volatile and non-volatile medium, removable and non-removable medium.

Memory 28 may include a computer system readable medium in the form of volatile memory, such as random access memory (RAM) 30 and/or cache memory 32. The computing device 12 may further include other removable/non-removable, volatile/non-volatile computer system storage medium. By way of example only, the storage system 34 may be provided for reading from and writing to a non-removable, non-volatile magnetic medium (e.g., a "hard drive", not shown in FIG. 5). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM (Compact Disc Read Only Memory), DVD-ROM (Digital Video Disc Read Only Memory) or other optical media can be provided. In such instances, each can be connected to bus 18 by one or more data medium interfaces. The memory 28 may include at least one program product having a set (e.g., at least one) of program modules that are configured to carry out the functions of embodiments of the present disclosure.

Program/utility 40 having a set (at least one) of program modules 42, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the disclosure as described herein.

The computing device 12 may also communicate with one or more external devices 14 such as a keyboard, a pointing device, a display 24, etc.; one or more devices that enable a user to interact with the computing device 12; and/or any device (e.g., network card, modem, etc.) that enables the computing device 12 to communicate with one or more other computing devices. Such communication can occur via Input/Output (I/O) interfaces 22. Still yet, the computing device 12 may communicate with one or more networks such as a local area network (LAN), a general wide area network (WAN), and/or a public network (e.g., the Internet) via network adapter 20. As depicted, the network adapter 20 communicates with the other components of the computing device 12 via the bus 18. It should be understood that although not shown, other hardware and/or software components could be used in conjunction with the computing device 12. Examples, include, but are not limited to: microcode, device drivers, redundant processing units, external disk drive arrays, RAID systems, tape drives, and data archival storage systems, etc.

The processing unit 16 may perform various function applications and data processing by executing programs stored on the system memory 28, for example, to implement the method mentioned in the above embodiments.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

In addition, terms such as "first" and "second" are used herein for purposes of description and are not intended to indicate or imply relative importance or significance or to imply the number of indicated technical features. Thus, the feature defined with "first" and "second" may include one or more of this feature. In the description of the present disclosure, the term "a plurality of" means at least two, for example, two, three or more, unless specified otherwise.

Any procedure or method described in the flow diagrams or described in any other way herein may be understood to include one or more modules, portions or parts for storing executable codes that realize particular logic functions or procedures. Moreover, advantageous embodiments of the present disclosure includes other implementations in which the order of execution is different from that which is depicted or discussed, including executing functions in a substantially simultaneous manner or in an opposite order according to the related functions. This should be understood by those skilled in the art to which embodiments of the present disclosure belong.

The logic and/or step described in other manners herein or shown in the flow diagram, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when being executed.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Although explanatory embodiments have been illustrated and described, it would be appreciated by those skilled in the art that the above embodiments cannot be construed to limit the present disclosure, and changes, alternatives, and modifications can be made in the embodiments without departing from the scope of the present disclosure.

What is claimed is:

1. A method for processing white balance, comprising:
   acquiring a first image frame with a face image at a first acquisition time point, and a second image frame without a face image at a second acquisition time point different from the first acquisition time point;
   performing a white balance processing for the first image frame based on a first gain value configured to adjust a color of the face image in the first image frame to a skin color;
   performing a white balance processing for the second image frame based on a second gain value different from the first gain value;
   determining a transitional gain value for a transitional image frame acquired between the first acquisition time point and the second acquisition time point, based on a transition strategy for transition between the first image frame and the second image frame; and
   performing a white balance processing for the transitional image frame based on the transitional gain value.

2. The method of claim 1, wherein determining the transitional gain value for the transitional image frame comprises: determining the transitional gain value for the transitional image frame based on a transition strategy for transition from the first image frame to the second image frame, when the first acquisition time point is earlier than the second acquisition time point.

3. The method of claim 2, wherein the transition strategy comprises at least one of:
   a smooth curve, indicating correspondence between gain values in a range from the first gain value to the second gain value and acquisition time points, or between gain values in a range from the second gain value to the first gain value and acquisition time points; and
   a rate of change, indicating an extent of change in gain value per unit of acquisition time point.

4. The method of claim 2, wherein before determining the transitional gain value for the transitional image frame, the method further comprises:
   performing a white balance processing for a transitional image frame acquired in a preset period of time based on the first gain value, wherein an initial time of the preset period of time is the first acquisition time point.

5. The method of claim 4, wherein determining the transitional gain value for the transitional image frame comprises:
   determining a transitional gain value for a transitional image frame acquired after the preset period of time ends, based on the transition strategy for transition from the first image frame to the second image frame, if each transitional image frame acquired in the preset period of time does not include a face image.

6. The method of claim 4, wherein after performing the white balance processing for the transitional image frame acquired in the preset period of time based on the first gain value, the method further comprises:
   performing a white balance processing for a transitional image frame acquired after the preset period of time ends based on the first gain value, if at least one transitional image frame acquired in the preset period of time includes a face image.

7. The method of claim 2, wherein after performing the white balance processing for the transitional image frame based on the transitional gain value, the method further comprises:
   performing a white balance processing for an image frame without a face image based on the second gain value, when the transitional gain value is equal to the second gain value.

8. The method of claim 1, wherein determining the transitional gain value for the transitional image frame comprises:
   determining the transitional gain value for the transitional image frame based on a transition strategy for transition from the second image frame to the first image frame, when the first acquisition time point is later than the second acquisition time point.

9. The method of claim 8, wherein the transition strategy comprises at least one of:
   a smooth curve, indicating correspondence between gain values in a range from the first gain value to the second gain value and acquisition time points, or between gain values in a range from the second gain value to the first gain value and acquisition time points; and
   a rate of change, indicating an extent of change in gain value per unit of acquisition time point.

10. The method of claim 8, wherein after performing the white balance processing for the transitional image frame based on the transitional gain value, the method further comprises:
    performing a white balance processing for an image frame with a face image based on the first gain value, when the transitional gain value is equal to the first gain value.

11. A computing device for processing white balance, comprising:
    one or more processors;
    a memory; and
    one or more programs, wherein the one or more programs are stored in the memory and configured to be executed by the one or more processors, the one or more programs including:
    an acquisition module, configured to acquire a first image frame with a face image at a first acquisition time point, and a second image frame without a face image at a second acquisition time point different from the first acquisition time point;
    a first processing module, configured to perform a white balance processing for the first image frame based on a first gain value configured to adjust a color of the face image in the first image frame to a skin color, and further configured to perform a white balance processing for the second image frame based on a second gain value different from the first gain value;
    a determination module, configured to determine a transitional gain value for a transitional image frame acquired between the first acquisition time point and the second acquisition time point, based on a transition strategy for transition between the first image frame and the second image frame; and
    a second processing module, configured to perform a white balance processing for the transitional image frame based on the transitional gain value.

12. The computing device of claim 11, wherein the determination module is further configured to determine the transitional gain value for the transitional image frame based on a transition strategy for transition from the first image frame to the second image frame, when the first acquisition time point is acquired is earlier than the second acquisition time point.

13. The computing device of claim 12, wherein the second processing module is further configured to perform a white balance processing for a transitional image frame acquired in a preset period of time based on the first gain value, and wherein an initial time of the preset period of time is the first acquisition time point.

14. The computing device of claim 13, wherein the determination module is further configured to determine a transitional gain value for a transitional image frame acquired after the preset period of time ends, based on the transition strategy for transition from the first image frame to the second image frame, if each transitional image frame acquired in the preset period of time does not include a face image.

15. The computing device of claim 13, wherein the second processing module is further configured to perform a white balance processing for a transitional image frame acquired after the preset period of time ends based on the first gain value, if at least one transitional image frame acquired in the preset period of time includes a face image.

16. The computing device of claim 12, wherein the second processing module is further configured to perform a white balance processing for an image frame without a face image based on the second gain value, when the transitional gain value is equal to the second gain value.

17. The computing device of claim 11, wherein the determination module is further configured to determine the transitional gain value for the transitional image frame based on a transition strategy for transition from the second image frame to the first image frame, when the first acquisition time point is later than the second acquisition time point.

18. The computing device of claim 17, wherein the second processing module is further configured to perform a white balance processing for an image frame with a face image based on the first gain value, when the transitional gain value is equal to the first gain value.

19. A nonvolatile computer readable storage medium storing computer executable instructions configured to control a computing device to execute a method for processing white balance, the method comprising:
    acquiring a first image frame with a face image at a first acquisition time point and a second image frame without a face image at a second acquisition time point different from the first acquisition time point;
    performing a white balance processing for the first image frame based on a first gain value configured to adjust a color of the face image in the first image frame to a skin color;
    performing a white balance processing for the second image frame based on a second gain value different from the first gain value;
    determining a transitional gain value for a transitional image frame acquired between the first acquisition time point and the second acquisition time point, based on a transition strategy for transition between the first image frame and the second image frame; and
    performing a white balance processing for the transitional image frame based on the transitional gain value.

20. The nonvolatile computer readable storage medium of claim 19, wherein the transition strategy comprises at least one of:
    a smooth curve, indicating correspondence between gain values in a range from the first gain value to the second gain value and acquisition time points, or between gain values in a range from the second gain value to the first gain value and acquisition time points; and
    a rate of change, indicating an extent of change in gain value per unit of acquisition time point.

* * * * *